(12) United States Patent
Youn et al.

(10) Patent No.: US 6,459,604 B1
(45) Date of Patent: Oct. 1, 2002

(54) POWER SUPPLY FOR BOTH AC AND DC

(75) Inventors: Dae-Young Youn, Daejeon (KR); Hun-June Kim, Daejeon (KR)

(73) Assignee: Smart Power Solutions, Inc., Daejon (KR)

( * ) Notice: Subject to any disclaimer, the term of this patent is extended or adjusted under 35 U.S.C. 154(b) by 0 days.

(21) Appl. No.: 09/933,844

(22) Filed: Aug. 21, 2001

(30) Foreign Application Priority Data

Dec. 13, 2000 (KR) .............................. 00-76132

(51) Int. Cl.[7] .............................. H02M 1/10
(52) U.S. Cl. .................. 363/142; 363/100; 323/351
(58) Field of Search .................. 363/142, 89, 100, 363/146; 307/11, 18, 22, 26, 43, 75, 82; 323/351, 353, 354

(56) References Cited

U.S. PATENT DOCUMENTS 5,715,156 A * 2/1998 Yilmaz et al. ............... 307/26
6,172,891 B1 * 1/2001 O'Neal et al. ............... 307/128

* cited by examiner

Primary Examiner—Jeffrey Sterrett
Assistant Examiner—Gary L. Laxton
(74) Attorney, Agent, or Firm—Pennie & Edmonds LLP

(57) ABSTRACT

A power supply for both alternating current (AC) and direct current (DC) which has an AC/DC converter and DC/DC converter detachably coupled with each other. The AC/DC converter is adapted to convert an AC input voltage into a DC signal, and the DC/DC converter is adapted to convert a DC input voltage into a DC signal. An output voltage selector is provided to obtain a DC output voltage appropriate to an associated device. The present power supply can be conveniently carried, supply power to an associated device regardless of AC and DC input voltages and select a level of an output DC voltage. Therefore, the present power supply can be used universally irrespective of the types of associated devices and manufacturers.

2 Claims, 5 Drawing Sheets

Prior Art

Prior Art

POWER SUPPLY FOR BOTH AC AND DC

BACKGROUND OF THE INVENTION

1. Field of the Invention

The present invention relates in general to a power supply for both alternating current (AC) and direct current (DC), and more particularly to a power supply for both AC and DC which is capable of selectively inputting AC and DC voltages from external power sources and converting the inputted voltages into a DC voltage appropriate to an associated device.

2. Description of the Prior Art

Portable small-sized power supplies, which are typically called adapters, are adapted for converting or transforming input voltages into voltages necessary to drive associated devices. Examples of such conventional portable small-sized power supplies are shown in FIGS. 1a to 1c herein.

FIG. 1a is a block diagram showing the construction of a conventional AC/DC power supply. As shown in this drawing, the conventional AC/DC power supply comprises a line filter 11 for attenuating electromagnetic noise contained in an AC input voltage, a transformer 12 for transforming a filtered AC signal from the line filter 11 into a voltage appropriate to an associated device, a controller 13 for controlling an output voltage of the power supply in response to a voltage fed from a secondary coil of the transformer 12 back thereto, and a rectifier 14 for rectifying a transformed AC signal from the transformer 12 into a DC signal and outputting the rectified DC signal as a drive voltage to the associated device.

In the above-mentioned conventional AC/DC power supply, the controller 13 controls the output voltage by adjusting a pulse duration of a pulse width modulation (PWM) signal in a trimmer manner or by setting the number of turns of the secondary coil of the transformer 12 to different values by regions in order to raise efficiency. However, this control method increases the volume and weight of the power supply, thereby making it inconvenient for a user to carry the power supply.

FIG. 1b is a block diagram showing the construction of a conventional DC/DC power supply. As shown in this drawing, the conventional DC/DC power supply comprises a line filter 21 for attenuating electromagnetic noise contained in a DC input voltage, a transformer 22 for transforming a filtered DC signal from the line filter 21 into a voltage appropriate to an associated device, and a controller 23 for controlling an output voltage of the power supply in response to a voltage fed from a secondary coil of the transformer 22 back thereto.

The above-mentioned DC/DC power supply is convenient to carry owing to its small size, but is disadvantageous in that a user has the trouble of having to carry it together with an AC/DC power supply while in motion for a lengthy period of time.

In order to solve the above problems with the conventional AC/DC power supply and DC/DC power supply, there has been proposed a power supply for both AC and DC having an AC/DC converter and DC/AC converter integral with each other, which power supply is disclosed in Korean Utility Model Laid-open Publication No. 1999-15641 and shown in FIG. 1c herein.

The proposed power supply comprises a constant-voltage circuit for maintaining a DC input voltage constant, a first filter for attenuating electromagnetic noise contained in the DC input voltage, a DC/DC converter integrated circuit (IC) for controlling the operation of a transistor in response to an output voltage of the transistor fed back thereto, a second filter for attenuating electromagnetic noise contained in an AC input voltage, a first rectifier for rectifying a filtered AC signal from the second filter into a DC signal, and a PWM control IC for driving a field effect transistor (FET) in a main switch to induce energy in a transformer. The switch acts to perform a switching operation to induce the energy in the transformer. The power supply further comprises a second rectifier for rectifying a voltage induced in a secondary coil of the transformer, and an error amplifier for, when overcurrent is generated in the secondary coil of the transformer, feeding the generated overcurrent back to the PWM control IC to drop the voltage induced in the secondary coil of the transformer so as to protect the power supply and associated circuitry from the overcurrent.

However, in the case where the proposed power supply is applied to large-capacity portable equipment, such as a notebook computer, to supply power thereto, it must be constructed with a heavy weight and large volume, resulting in an increase in manufacturing cost. Further, it is very inconvenient to use within transportation means, such as an airplane, vehicle, vessel and the like.

SUMMARY OF THE INVENTION

Therefore, the present invention has been made in view of the above problems, and it is an object of the present invention to provide a power supply for both alternating current (AC) and direct current (DC) which has an AC/DC converter and DC/DC converter detachably coupled with each other.

It is another object of the present invention to provide a power supply for both AC and DC which is capable of selecting a level of an output DC voltage.

In accordance with the present invention, the above and other objects can be accomplished by the provision of a power supply for both alternating current (AC) and direct current (DC), comprising an AC/DC converter including a first line filter for attenuating electromagnetic noise contained in an AC input voltage, a rectifier for converting a filtered AC signal from the first line filter into a DC signal, a transformer for transforming the DC signal converted by the rectifier into a desired DC voltage, and a first pulse width modulation (PWM) controller for controlling an operation of the transformer; and a DC/DC converter detachably coupled with the AC/DC converter, the DC/DC converter including a second line filter for inputting the DC voltage from the AC/DC converter or an external DC voltage and attenuating electromagnetic noise contained in the inputted DC voltage, a drive voltage output unit for converting a filtered DC signal from the second line filter into a drive voltage to drive an associated device, a second PWM controller for controlling an operation of the drive voltage output unit, and an output voltage controller for controlling a voltage level of an output DC signal from the drive voltage output unit.

Preferably, the power supply may further comprise an output voltage selector connected to the DC/DC converter, the output voltage selector selecting a voltage level appropriate to the associated device and controlling an operation of an oscillator in the second PWM controller according to the selected voltage level so as to control the voltage level of the output DC signal from the drive voltage output unit.

More preferably, the output voltage controller may include a resistor array; and a multiplexer for selecting a resistance of the resistor array in response to a value selected by a dip switch in the output voltage selector and outputting a control signal based on the selected resistance to the oscillator in the second PWM controller to select the voltage level of the output DC signal from the drive voltage output unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1A:
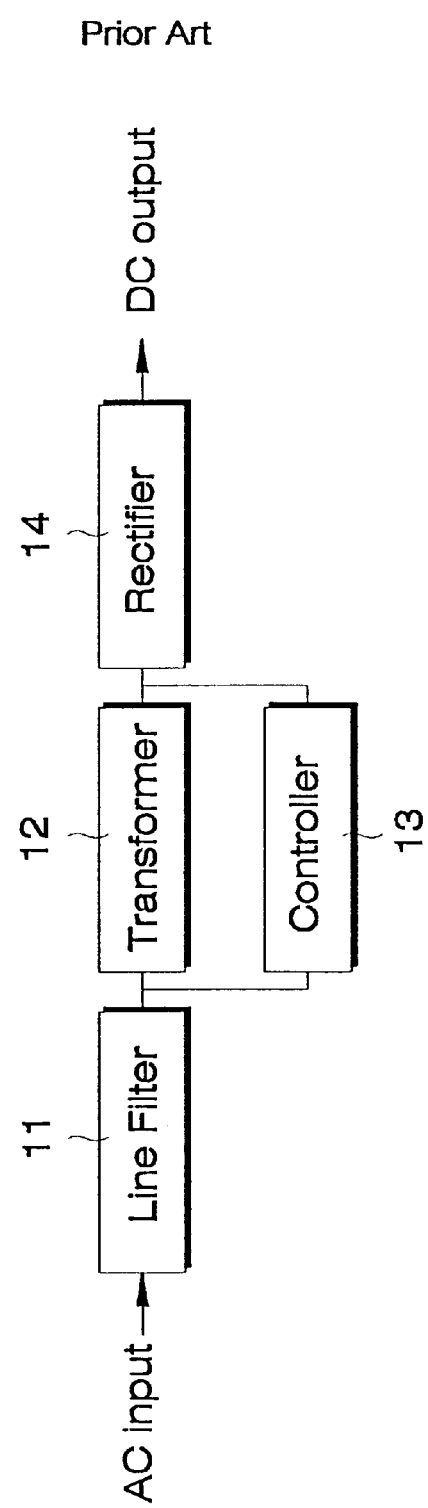
FIG. 1a is a block diagram showing the construction of a conventional AC/DC power supply.
Figure 1B:
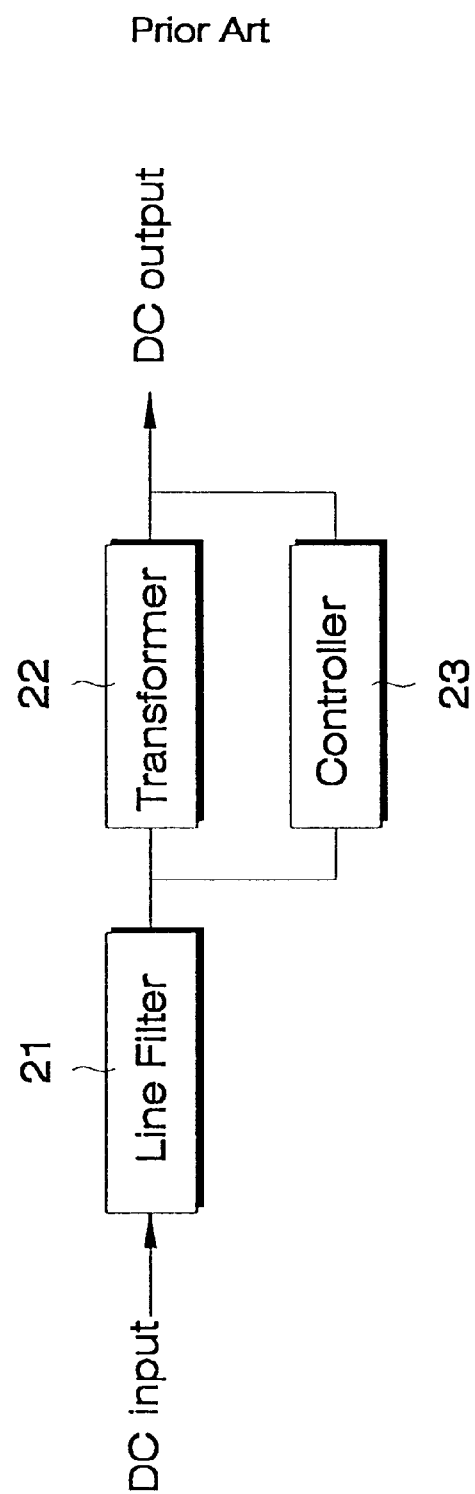
FIG. 1b is a block diagram showing the construction of a conventional DC/DC power supply.
Figure 1C:
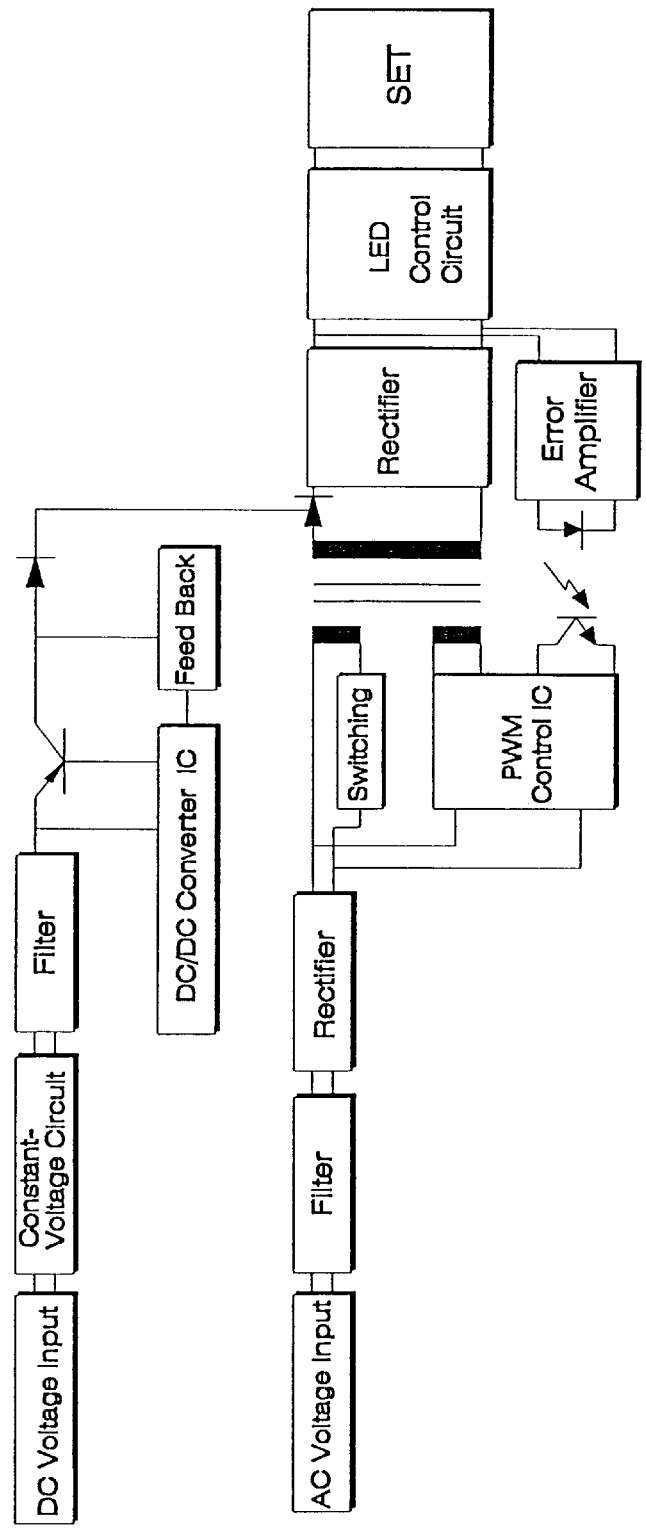
FIG. 1c is a block diagram showing the construction of a conventional power supply for both AC and DC.
Figure 2:
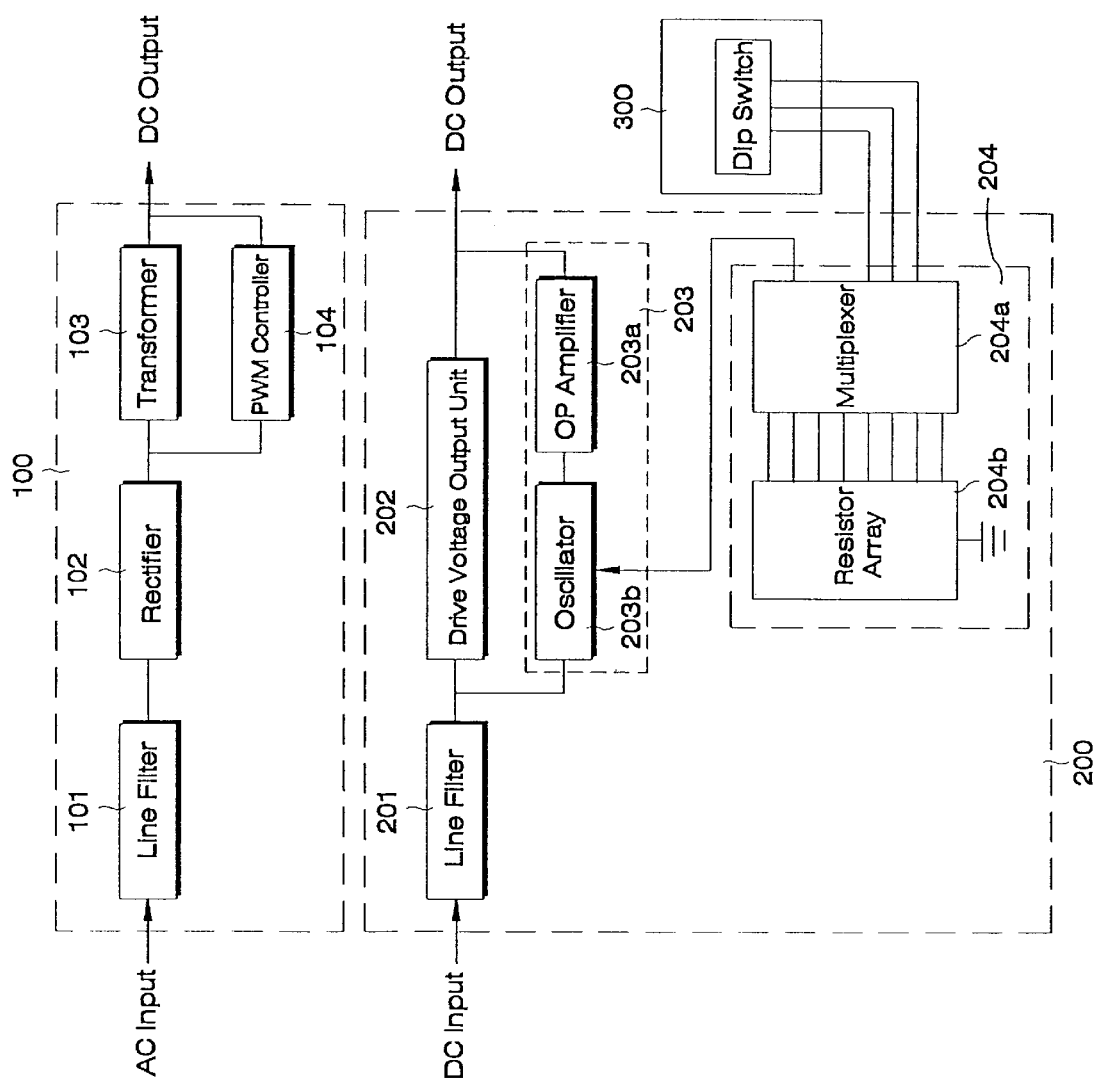
FIG. 2 is a block diagram showing the construction of a power supply for both AC and DC in accordance with the present invention.
Figure 3:
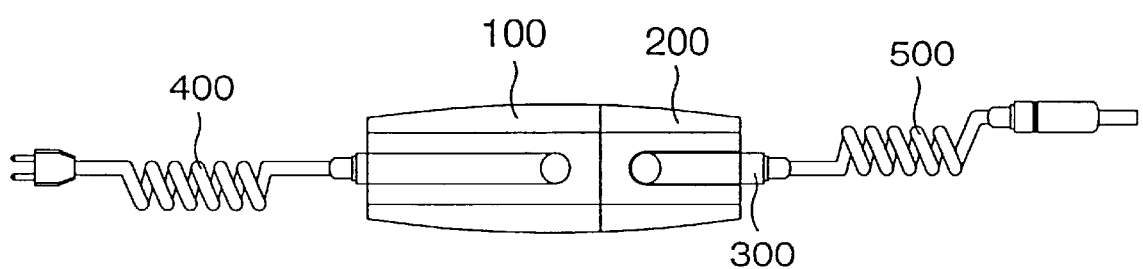
FIG. 3 is a view showing different embodiments of connections of the power supply in accordance with the present invention.
Figure 3:
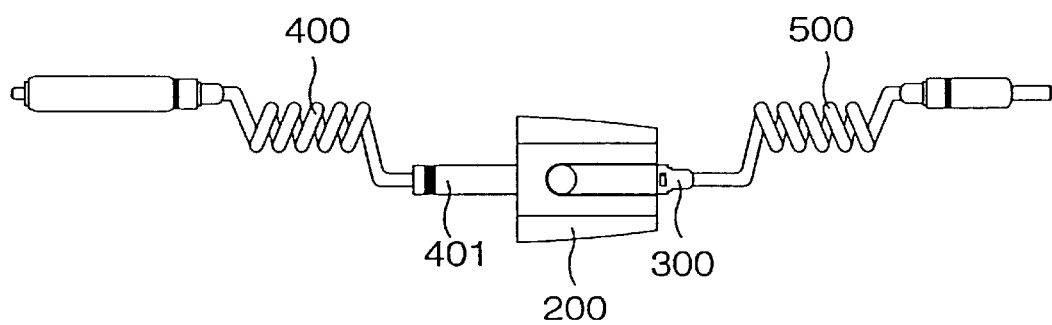

FIG. 2 is a block diagram showing the construction of a power supply for both AC and DC in accordance with the present invention and FIG. 3 is a view showing different embodiments of connections of the power supply in accordance with the present invention.

The power supply for both AC and DC according to this invention comprises an AC/DC converter 100, DC/DC converter 200 and output voltage selector 300.

The AC/DC converter 100 is adapted to input an AC voltage and output a desired DC signal.

The DC/DC converter 200 is adapted to input a DC voltage and output a desired DC signal. This converter 200 preferably has means (not shown) detachably coupled with the AC/DC converter 100 or receiving a jack 401 of an input cable 400 that inputs an external DC voltage. As a result, the converter 200 inputs the DC voltage from the AC/DC converter 100 or the external DC voltage from the input cable 400 and outputs a desired DC signal.

The output voltage selector 300 is adapted to select a level of a DC output voltage from the DC/DC converter 200, appropriate to an associated device (not shown), such as a notebook computer, camcorder, mobile telephone or the like. To this end, the output voltage selector 300 is installed in a coupled portion between the DC/DC converter 200 and an output cable 500 connected to the associated device.

In more detail, the AC/DC converter 100 includes a line filter 101, rectifier 102, transformer 103 and PWM controller 104.

The line filter 101 acts to attenuate electromagnetic noise contained in the AC input voltage.

The rectifier 102 acts to convert a filtered AC signal from the line filter 101 into a DC signal.

The transformer 103 acts to transform the DC signal converted by the rectifier 102 into a desired DC signal.

The PWM controller 104 acts to control the operation of the transformer 103.

That is, in the AC/DC converter 100, the line filter 101 inputs the AC voltage and attenuates electromagnetic noise contained in the inputted AC voltage. The rectifier 102 converts the noise-attenuated AC voltage into a DC signal, and the transformer 103 transforms the converted DC signal into a desired DC signal under the control of the PWM controller 104 and outputs the transformed DC signal as an input voltage to the DC/DC converter 200.

The DC/DC converter 200 includes a line filter 201, drive voltage output unit 202, PWM controller 203 and output voltage controller 204.

The line filter 201 acts to attenuate electromagnetic noise contained in the DC input voltage.

The drive voltage output unit 202 acts to convert a filtered DC signal from the line filter 201 into a drive voltage to drive an associated device (not shown), such as a notebook computer, camcorder, mobile telephone or the like.

The PWM controller 203 acts to control the operation of the drive voltage output unit 202. To this end, the PWM controller 203 includes an operational (OP) amplifier 203a for comparing an output voltage from the drive voltage output unit 202, fed back thereto, with a reference voltage, and an oscillator 203b for outputting a drive signal to drive the drive voltage output unit 202 when the result of comparison by the OP amplifier 203a indicates that the output voltage from the output unit 202 is lower in level than the reference voltage. As a result, the OP amplifier 203a compares the output voltage from the drive voltage output unit 202, fed back thereto, with the reference voltage and provides the compared result to the oscillator 203b. Where the result of comparison by the OP amplifier 203a indicates that the output voltage from the drive voltage output unit 202 is lower in level than the reference voltage, the oscillator 203b outputs the drive signal to the output unit 202 to drive it.

The output voltage controller 204 includes a resistor array 204b, and a multiplexer 204a for selecting a resistance of the resistor array 204b in response to a value selected by a dip switch in the output voltage selector 300 and outputting a control signal based on the selected resistance to the oscillator 203b in the PWM controller 203 to control the level of the DC output voltage from the drive voltage output unit 202.

The output voltage selector 300 is adapted to select a level of the DC output voltage from the DC/DC converter 200, appropriate to an associated device, such as a notebook computer, camcorder, mobile telephone or the like. To this end, the output voltage selector 300 includes a dip switch for controlling an operation timing of the drive voltage output unit 202 in the DC/DC converter 200 so as to control the output voltage from the output unit 202.

As described above, in the power supply for both AC and DC according to the present invention, the AC/DC converter 100 for conversion of an AC input voltage into a DC signal and the DC/DC converter 200 for conversion of a DC input voltage into a DC signal are detachably coupled with each other. Therefore, in order to supply power to an associated device, such as a notebook computer, camcorder, mobile telephone or the like, the AC/DC converter 100 and the DC/DC converter 200 are used together where an AC power source is employed, whereas only the DC/DC converter 200 is used where a DC power source is employed. As a result, the present power supply is convenient to carry and use.

It is common practice that notebook computers, camcorders, mobile telephones and so forth employ different rated voltage/current values according to manufacturers. For example, for notebook computers, a rated voltage is 24V for Powerbook series by Apple, 19V for Presario series by Compaq and Sensenote series by Samsung, 18V for Satellite series by Toshiba, 16V for ThinkPad series by IBM and Vaio series by Sony, and 12V for Omnibook series by HP. DC output voltages appropriate to associated devices can be obtained by means of the output voltage selector 300, so that the present power supply can be used universally irrespective of the types of the devices and manufacturers.

In a different manner from conventional techniques, the DC/DC converter can be separated from the AC/DC converter to supply power to an associated device by itself. Hence, the present power supply is usefully applicable to facilities sensitive to electromagnetic waves, such as airplanes, in that it can prevent high-power electromagnetic waves from being generated during a high-voltage switching operation.

Therefore, the power supply for both AC and DC according to the present invention can accomplish the aforementioned objects.

As apparent from the above description, the present invention provides a power supply for both alternating current (AC) and direct current (DC) which has an AC/DC converter and DC/DC converter detachably coupled with each other. The present power supply can be conveniently carried, supply power to an associated device regardless of AC and DC input voltages and select a level of an output DC voltage. Therefore, the present power supply can be used universally irrespective of the types of associated devices and manufacturers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power supply for both alternating current (AC) and direct current (DC), comprising:

an AC/DC converter including a first line filter for attenuating electromagnetic noise contained in an AC input voltage, a rectifier for converting a filtered AC signal from said first line filter into a DC signal, a transformer for transforming the DC signal converted by said rectifier into a desired DC voltage, and a first pulse width modulation (PWM) controller for controlling an operation of said transformer;

a DC/DC converter detachably coupled with said AC/DC converter, said DC/DC converter including a second line filter for inputting said DC voltage from said AC/DC converter or an external DC voltage and attenuating electromagnetic noise contained in the inputted DC voltage, a drive voltage output unit for converting a filtered DC signal from said second line filter into a drive voltage to drive an associated device, a second PWM controller for controlling an operation of said drive voltage output unit, and an output voltage controller for controlling a voltage level of an output DC signal from said drive voltage output unit; and an output voltage selector connected to said DC/DC converter, said output voltage selector selecting a voltage level appropriate to the associated device and controlling an operation of an oscillator in said second PWM controller according to the selected voltage level so as to control the voltage level of the output DC signal from said drive voltage output unit.

2. The power supply as set forth in claim 1, wherein said output voltage controller includes:

a resistor array; and a multiplexer for selecting a resistance of said resistor array in response to a value selected by a dip switch in said output voltage selector and outputting a control signal based on the selected resistance to said oscillator in said second PWM controller to select the voltage level of the output DC signal from said drive voltage output unit.

* * * * *